Figure 1:
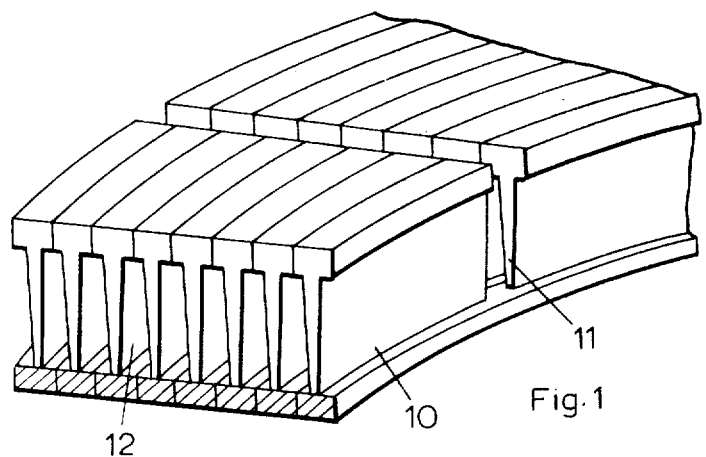

United States Patent
Palfreyman et al.

[15] 3,675,294
[45] July 11, 1972

[54] METHOD OF MAKING A BLADED ROTOR

[72] Inventors: Jack Palfreyman; Henry Edward Middleton, both of Derby, England

[73] Assignee: The Secretary of State for Defense in Her Britannic Majesty's Government of the United Kingdom of Great Britain and Northern Ireland, London, England

[22] Filed: Dec. 22, 1970

[21] Appl. No.: 100,563

Related U.S. Application Data

[63] Continuation-in-part of Ser. No. 806,188, March 11, 1969, abandoned.

[30] Foreign Application Priority Data

March 20, 1968 Great Britain..................13,498/68

[52] U.S. Cl..................23/156.8 R, 29/41 G, 29/DIG. 1, 156/172, 264/257, 264/267, 416/213, 416/230
[51] Int. Cl........................................................B21k 3/04
[58] Field of Search................264/267, 257; 156/169, 172; 416/230, 213, 229 A; 29/156.8 R, 41 G, DIG. 1

[56] References Cited

UNITED STATES PATENTS

| | | | |
|---|---|---|---|
| 2,857,094 | 10/1958 | Erwin | 416/230 |
| 3,279,967 | 10/1966 | Martin et al. | 156/172 |
| 3,403,844 | 10/1968 | Stoffer | 416/230 |
| 3,505,717 | 4/1970 | Palfreyman | 29/156.8 R |
| 3,549,444 | 12/1970 | Katz | 156/175 |

Primary Examiner—John F. Campbell
Assistant Examiner—D. C. Reiley
Attorney—Cushman, Darby & Cushman

[57] ABSTRACT

A bladed rotor is made by a method comprising forming a plurality of similar annular wall members into an annular assembly in which there is a circumferentially extending annular recess between each adjacent pair of annular wall members, and in which there are a plurality of angularly spaced apart axially extending slots which extend to the circumference of the assembly, filling each such annular recess with fibrous material, and securing in the said slots tanged root portions of aerofoil-shaped blades, the blades being formed of fibrous material and the fibers in the blades being bonded to the fibers in the recesses.

8 Claims, 5 Drawing Figures

PATENTED JUL 11 1972 3,675,294

SHEET 1 OF 2

Inventors
JACK PALFREYMAN
HENRY EDWARD MIDDLETON

By
Cushman, Darby, Cushman Attorney

Inventors
JACK PALFREYMAN
HENRY EDWARD MIDDLETON
By
Cushman, Darby & Cushman Attorney

METHOD OF MAKING A BLADED ROTOR

This application is a Continuation-in-Part of our copending application Ser. No. 806,188 filed Mar. 11, 1969, now abandoned.

This invention concerns a method of making a bladed rotor, and although the invention is not so restricted, it is more particularly concerned with making a bladed rotor for a compressor of a gas turbine engine.

According to the present invention, there is provided a method of making a bladed rotor comprising forming a plurality of similar annular wall members into an annular assembly in which there is a circumferentially extending annular recess between each adjacent pair of annular wall members, and in which there are a plurality of angularly spaced apart axially extending slots which extend to the circumference of the assembly, winding a continuous filamentary fiber coated with a liquid synthetic resin into each such annular recess so as to fill the recess therewith, and divide each slot into a row of axially spaced cavities between the ends of adjacent pairs of walls, inserting into a row of cavities, an aerofoil-shaped blade having tanged root portions thereon corresponding to the spacing and dimensions of the row of cavities, the aerofoil blade being formed of a fibrous material and a synthetic resin material thereby bonding each tang to the continuous filamentary fibers and the wall members surrounding its associated cavity.

Preferably the method further includes the steps of inserting filler pieces into said angularly spaced apart axially extending slots before winding the continuous filamentary fiber into each annular recess and then removing said filler pieces from said slots after the winding of the fibers to leave a plurality of angularly spaced apart axially extending rows of said cavities between adjacent pairs of annular wall members.

The said slots may either be formed by appropriate casting or moulding of the groups of wall members or by assembling fully annular wall members together and then slotting the annular wall members.

The fibers are preferably carbonaceous fibers such as may be produced from polyacrylonitrile.

The cross-sectional area of the annular recesses preferably increases in the radially inward direction.

At each of the axially opposite ends of the said assembly, there may be an annular end piece which extends radially outwardly of the wall members to define therewith a shallow trough which receives circumferentially extending parts of the root portions of the blades, the parts of the trough between the root portions being filled with fibrous material.

The wall members may be made of synthetic resin and may be bonded together by placing said wall members in a common mould and curing them.

Figure 2:
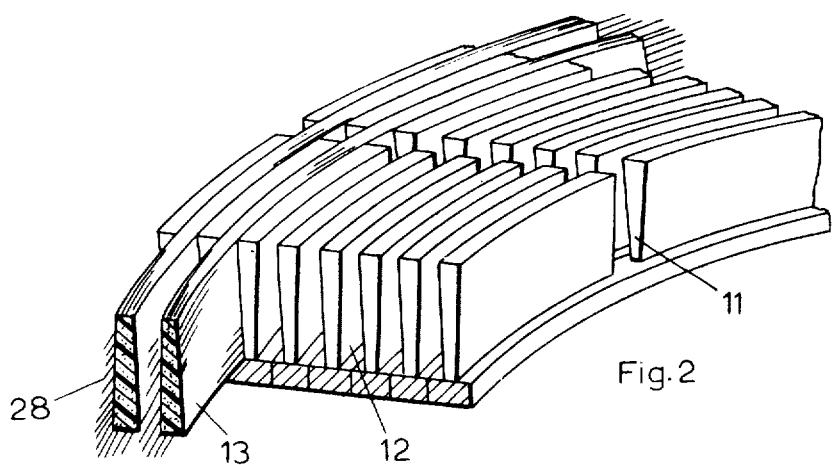
Figure 3:
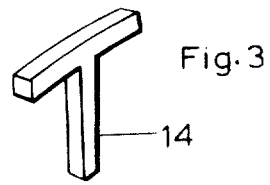
Figure 4:
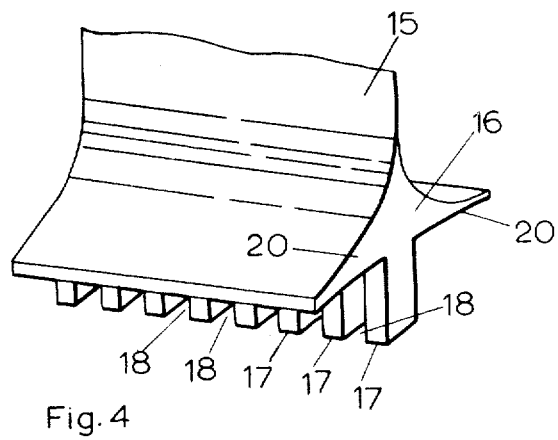
Figure 5:
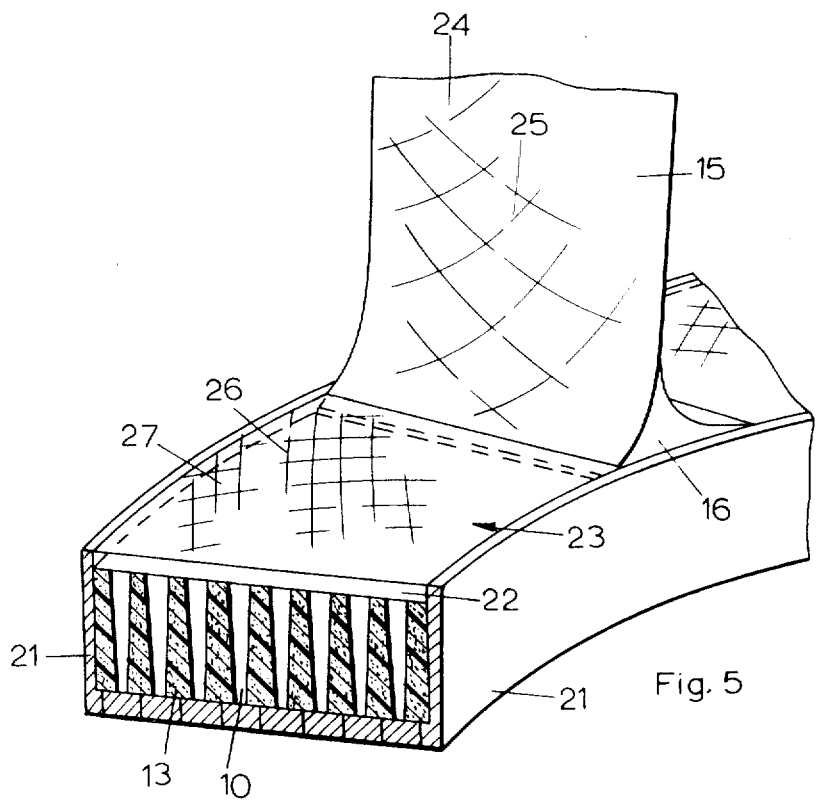

The invention is illustrated, merely by way of example, in the accompanying drawings, in which:

FIG. 1 is a diagrammatic sectioned perspective view of an initial stage in the manufacture of a bladed rotor in accordance with the present invention, FIG. 2 is a view similar to FIG. 1, but illustrating a subsequent stage, FIG. 3 is a perspective view of a filler piece employed during the said manufacture, FIG. 4 is a sectioned perspective view of a part of one of the blades of the bladed rotor, and FIG. 5 is a perspective view illustrating a portion of the completed bladed rotor.

A compressor rotor of a gas turbine engine is made by assembling together a plurality of similar parallel fully annular wall members (FIG. 1), each of which is of I-section and is bonded to the adjacent wall members, and then mechanically slotting the annular assembly of wall members. Thus this assembly is provided with a plurality of angularly spaced apart axially extending slots 11 which extend to the circumference of the said assembly which space apart a number of separate wall members 10.

The wall members 10 are of synthetic resin material such as an epoxy resin and are strengthened by having circumferentially extending fibers, e.g. carbonaceous fibers formed from polyacrylonitrile, embedded in them.

The wall members 10 are assembled in the position shown in FIG. 1 by the use of a former (not shown) which will be subsequently removed. Since the wall members 10 are formed of synthetic resin material, they are bonded together by curing them in a common mould.

It will be noted that the annular assembly which has been formed by the process described above, has a number of circumferentially extending annular recesses 12, a recess 12 being disposed between each adjacent pair of wall members 10.

The radially outer ends, or "tops," of the I-shaped wall members 10 are now removed by grinding, and before the recesses 12 are filled with fibrous material 13, the "vertical" limbs of a pair of T-shaped filler pieces 14 are introduced into each slot 11 to opposite sides of the central web of the respective wall member 10. The fibrous material is then introduced into the recesses 12 by passing a continuous length of fiber 28, e.g. carbonaceous fiber formed from polyacrylonitrile, through a liquid resin take-up point (e.g. a bath of the resin, or equipment for drip feeding the resin onto the fiber) and then winding the fiber into the recess. The filler pieces 14 act to confine the fibrous material between the wall members 10.

By reason of the fact that each of the annular recesses increases in cross-sectional area in the radially inward direction, the mass of fibrous material 13 comprising both fiber 28 and resin has a tapered shape which serves to key it into the annular recess. The mass of fibrous material 13 engages with the base portions of the wall members 10 and will, therefore, support the walls against centrifugal forces.

The filler pieces 14 are of wax so that they can be melted out when the winding process is complete.

The compressor rotor is provided with a plurality of angularly spaced apart blades 15 (FIG. 3). Each blade 15 has a root portion 16 having a plurality of tangs 17, with gaps 18 therebetween, and circumferentially extending platform parts 20.

The tangs 17 of each of the blades 15 are introduced into the slots 11, e.g. by spring loading the blades radially inwardly, in such a way that the fibrous material 13 passes through the gaps 18.

Each of the blades 15 is of fibrous material which extends to the surface of the tangs 17, e.g. is of fiber-reinforced synthetic resin material, together with a bonding material cured by heat or by catalytic action, the fibers preferably being carbonaceous fibers formed from polyacrylonitrile.

The compressor rotor is completed by providing it with annular end pieces 21 at each of the axially opposite ends of the assembly, the end pieces 21 extending radially outwardly of the wall members 10 so as to define therewith a shallow trough 22 which receives the circumferentially extending platform parts 20 of the root portions 16 of the blades 15. The parts of the trough 22 between the root portions 16 are filled with fibrous material e.g. in the form of sheets 23 thereof.

The whole assembly is then placed in a mould and cured with the result that the resin and fibers in the aerofoil-shaped blades 15 are bonded to the resin and fibers of the fibrous material 13 in the annular recesses 12 and to the resin and fibers of the annular walls 10.

In operation, therefore, the loads in the blades 15 are transferred in shear into the fibrous material 13 whose fibers extend circumferentially, thus making for a very strong construction.

The strength of which will be further improved by suitably arranging the fibers in the various parts of the rotor. Thus, in one improved embodiment, the blades 15 themselves are formed of cross-woven fibers 24, 25, as shown in FIG. 5, while the sheets 23 are formed of cross-woven fibers 26, 27, as shown in FIG. 5.

Yet further strength will be provided by employing fibers (not shown) to effect cross-tying between blades.

In an alternative embodiment of the invention, instead of starting with fully annular wall members and then, in effect, converting them into annular groups of separate wall members by the said slotting, annular groups of separate wall members may be formed by casting or moulding the wall members so as to provide the slots 11 ab initio.

In alternative embodiments of the invention the members 10 may be formed of a foamed synthetic resin material, or a foamed ceramic material, or may be metallic. A further possibility is for the members 10 to consist of carbonaceous fibers extending through carbonaceous material.

Although the embodiment of the invention described above includes the use of T-shaped filler pieces 14 during the winding of resin coated fibers into the recesses 14 will readily be appreciated that such filler pieces 14 are not essential to the performance of the invention. The fiber can be wound into the recesses without the presence of filler pieces but with the additional risk of filling the spaces with any excess resin material. However, the method of the invention may be carried out successfully without the filler pieces 14 and so the invention is not restricted to such filler pieces.

Although the invention has been primarily described with reference to its use in a compressor rotor, it is not so restricted. Thus, by the use of appropriate materials, the invention is applicable to turbine rotors. Moreover, an alternative use for the invention is in forming a ducted fan of a gas turbine engine, the blades of the fan being, for example, mechanically supported at their radially inner ends, and supported by a hydro-dynamic air bearing at their radially outer ends.

We claim:

1. A method of making a bladed rotor comprising:
   a. forming a plurality of similar annular wall members into an annular assembly in which there is a circumferentially extending annular recess between each adjacent pair of annular wall members and in which there are a plurality of angularly spaced apart axially extending slots which extend to the circumference of the assembly,
   b. winding a continuous filamentary fiber coated with a liquid synthetic resin into each annular recess to fill the recess therewith and divide each slot into a row of axially spaced cavities between the ends of adjacent pairs of annular wall members,
   c. inserting into a row of cavities an aerofoil-shaped blade having tanged roots thereon corresponding to the spacing and dimensions of the row of spaced cavities, the aerofoil blade being formed of a fibrous material and a synthetic resin material thereby bonding each tang to the continuous filamentary fibers and the wall members surrounding its associated recess.

2. A method according to claim 1 and further including the steps of:
   d. inserting filler pieces into said angularly spaced-apart axially extending slots before winding the continuous fiber filament into each annular recess,
   e. removing said filler pieces from said slots after the winding of the continuous filaments to leave a plurality of angularly spaced-apart axially extending rows of said cavities between the ends of adjacent annular wall members.

3. A method as claimed in claim 1 in which the said slots are formed by assembling annular wall members together and then slotting the annular wall members.

4. A method as claimed in claim 1 in which the fibrous material in the annular recesses and in the blades is fiber-reinforced synthetic resin material.

5. A method as claimed in claim 1 in which the fibers are carboniferous fibers.

6. A method as claimed in claim 1 in which the cross-sectional area of the annular recesses increases in the radially inward direction.

7. A method as claimed in claim 1 in which at each of the axially opposite ends of the said assembly there is an annular end piece which extends radially outwardly of the wall members to define therewith a shallow trough which receives circumferentially extending parts of the root portions of the blades, the parts of the trough between the root portions being filled with fibrous material.

8. The method as claimed in claim 1 in which the wall members are made of synthetic resin and are bonded together by placing said wall members in a common mould and curing them.

* * * * *